United States Patent
Paulino et al.

(10) Patent No.: US 9,481,462 B2
(45) Date of Patent: Nov. 1, 2016

(54) MODULAR PASSENGER SERVICE UNITS AND ASSEMBLIES THEREOF

(71) Applicant: EMBRAER S.A., São José dos Campos (BR)

(72) Inventors: Amauri Paulino, São José dos Campos-SP (BR); Sergio Luiz Abdalla Gomide, São José dos Campos-SP (BR); Gustavo Selofite de Arruda, São José dos Campos-SP (BR); Nilmar César Ferreira, São José dos Campos-SP (BR); Luciano dos Santos Ribeiro, São José dos Campos-SP (BR); Demétrio Andrade de Campos, São José dos Campos-SP (BR); Sergio Augusto Meireles Filho, São José dos Campos-SP (BR); Frederico Lara de Oliveira, São José dos Campos-SP (BR); Douglas Gonçalves de Albuquerque, São José dos Campos-SP (BR); Helio Albino, São José dos Campos-SP (BR); André Duarte Stein, São José dos Campos-SP (BR); Paul Priestman, London (GB); Daniel Macinnes, London (GB); Luciano Ricardo Magalhães da Silva, São José dos Campos-SP (BR); Ricardo Rosa Macêdo, São José dos Campos-SP (BR)

(73) Assignee: EMBRAER S.A., São Jodé Dos Campos (BR)

( * ) Notice: Subject to any disclaimer, the term of this patent is extended or adjusted under 35 U.S.C. 154(b) by 0 days.

(21) Appl. No.: 14/455,452

(22) Filed: Aug. 8, 2014

(65) Prior Publication Data
US 2015/0097082 A1 Apr. 9, 2015

Related U.S. Application Data

(60) Provisional application No. 61/887,313, filed on Oct. 4, 2013.

(51) Int. Cl.
*B64D 11/00* (2006.01)
*A62B 7/14* (2006.01)
*B64D 13/00* (2006.01)

(52) U.S. Cl.
CPC ............ *B64D 11/0015* (2013.01); *A62B 7/14* (2013.01); *B64D 11/00* (2013.01); *B64D 11/003* (2013.01); *B64D 13/00* (2013.01); *B64D 2011/0038* (2013.01); *B64D 2011/0046* (2013.01); *B64D 2011/0053* (2013.01); *B64D 2013/003* (2013.01); *B64D 2231/025* (2013.01)

(58) Field of Classification Search
CPC  B64D 11/0015; B64D 13/00; B64D 11/003; B64D 11/00; B64D 2011/0038; B64D 2011/0046; B64D 2231/025; B64D 2013/003; B64D 2011/0053; A62B 7/14
See application file for complete search history.

(56) References Cited

U.S. PATENT DOCUMENTS

| | | | |
|---|---|---|---|
| 5,395,074 A * | 3/1995 | Hart .................... | B64D 11/003 244/118.1 |
| D583,749 S | 12/2008 | Aruga et al. | |

(Continued)

*Primary Examiner* — Valentina Xavier
(74) *Attorney, Agent, or Firm* — Nixon & Vanderhye P.C.

(57) ABSTRACT

Elongate passenger service unit (PSU) assemblies are comprised of a plurality of modular passenger service units, and a plurality of variable-length modular spacer units. The modular spacer units are positioned between the modular passenger service units in an end-to-end manner so as to provide a desired lengthwise array of the passenger service units along the PSU assembly. Transport category vehicles, e.g., aircraft, may thus be provided with inboard and outboard PSU assemblies. The passenger seats may be arranged in a latitudinally side-by-side arrangement and/or may be arranged in a longitudinally staggered arrangement. By providing variable length modular spacer units, therefore, the individual passenger service units may be arranged directly overhead of each passenger seat.

30 Claims, 6 Drawing Sheets

(56) References Cited

U.S. PATENT DOCUMENTS

| | | | |
|---|---|---|---|
| 8,930,088 B2 * | 1/2015 | Bauer | B64D 11/00 701/13 |
| 2007/0061847 A1 * | 3/2007 | Callahan | B64D 11/0015 725/76 |
| 2010/0240290 A1 * | 9/2010 | Markwart | B64D 13/00 454/71 |
| 2011/0163697 A1 * | 7/2011 | Mizukami | B60Q 3/0283 315/324 |
| 2012/0267476 A1 * | 10/2012 | Thomas | B64D 13/00 244/1 N |

* cited by examiner

MODULAR PASSENGER SERVICE UNITS AND ASSEMBLIES THEREOF

CROSS-REFERENCE TO RELATED APPLICATIONS

This application is based on and claims domestic priority under 35 USC §119(e) to U.S. Provisional Application Ser. No. 61/887,313 and is related to commonly owned U.S. Design Patent Application No. 29/469,017, each being filed on filed on Oct. 4, 2013, the entire contents of each such prior filed application being expressly incorporated hereinto by reference.

FIELD

The embodiments disclosed herein relate generally to passenger service units and assemblies thereof that may be employed in interiors of transport vehicles, especially aircraft interior cabins.

BACKGROUND

The traditional Passenger Service Units (PSUs) for transport category commercial aircraft are typically a one-piece unit that integrally accommodates multiple service functions for passenger comfort and/or safety, such as air flow, reading lights, crew assistance call buttons, crew messages and concealed oxygen delivery masks. Usually the conventional PSU will located overhead in such a manner that passengers seated side-by-side in the same row will need to share PSU controls associate with their particular seat. Such a sharing arrangement can present uncomfortable situations during use, for example, by a passenger's forearm and/or elbow inadvertently striking an adjacent passenger's head or at least invading the adjacent passenger's personal space when reaching to operate the PSU controls.

Conventional PSUs also do not have the passenger-operated controls (e.g., individual reading lights and air flow nozzles) positioned at an optimal location for each seat in a row. That is, since the conventional once piece PSUs are oriented along the aircraft's longitudinal axis, they must be positioned such that all passengers seated in a row (i.e., seated side-by-side along an axis transverse to the aircraft's longitudinal axis), they necessarily must be located overhead so as to be accessible by all passengers in that row. This means that a conventional PSU must be located overhead in such a manner that it is capable of servicing all passengers in the row, which in turn dictates that the PSU cannot be accessed comfortably by all such passengers (i.e., causing some of the passengers to reach across another passenger when it is necessary to operate the PSU functions). In addition, it is a common occurance that the reading light and/or air flow may encounter interference or obstruction from an immediately adjacent passenger.

The conventional one-piece PSUs are also inflexible as to cabin arrangement options that may be available to the interior design. For example, the conventional one-piece PSU must be oriented along a common longitudinal axis and thus cannot be positioned along another longitudinal axis in order to accommodate passenger seats in a different side-by-side coordinate relationship.

One proposal in the art is provided by US Patent Application Publication 2012/0012707 (the entire content of which is expressly incorporated hereinto by reference) which suggests that passenger supply functions be integrated in a storage compartment module that may be automatically hooked up to the supply system of the aircraft during mechanical installation of the module on a load-bearing structure of the cabin.

Further improvements and solutions to the problems noted previously are however needed. Therefore, what has been needed in this art are PSUs that have installation flexibility so as to provide optimum location of passenger service functions to minimize or substantially eliminate the problems associated with conventional one-piece PSUs. It is towards fulfilling such a need that the embodiments of the present invention are directed.

SUMMARY

In general, the embodiments disclosed herein are directed toward passenger service units and assemblies thereof. According to certain embodiments, elongate passenger service unit (PSU) assemblies are comprised of a plurality of modular passenger service units, and a plurality of variable-length modular spacer units. The modular spacer units are positioned between the modular passenger service units in an end-to-end manner so as to provide a desired lengthwise array of the passenger service units along the PSU assembly.

According to some embodiments, the PSU assemblies will further comprise at least one modular audio speaker unit connected in an end-to-end manner with at least one of the modular passenger service units and/or at least one modular emergency oxygen component accommodating at least one emergency oxygen delivery system therewithin. The modular emergency oxygen component will thus be connected in an end-to-end manner with at least one of the modular passenger service units. Certain ones of the modular emergency oxygen components may be of variable length as compared to others of the modular emergency oxygen components, each respectively accommodating at least one emergency oxygen delivery system therewithin.

The modular passenger service units included in the PSU assemblies may include a light unit and a light switch to activate/deactivate the light unit, an attendant call button and an air flow outlet diverter. According to some embodiments, the air flow outlet diverter may be in the form of a plurality of pivotal vanes, in which case a recessed channel may be provided adjacent to the vanes to allow for manual manipulation thereof. A perimeter light band may be provided so as to bound the light unit, attendant call button and air flow diverter.

Transport category vehicles, e.g., aircraft, may thus be provided with inboard and outboard PSU assemblies. The passenger seats may be arranged in a latitudinally side-by-side arrangement and/or may be arranged in a longitudinally staggered arrangement. By providing variable length modular spacer units, therefore, the individual passenger service units may be arranged directly overhead of each passenger seat.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
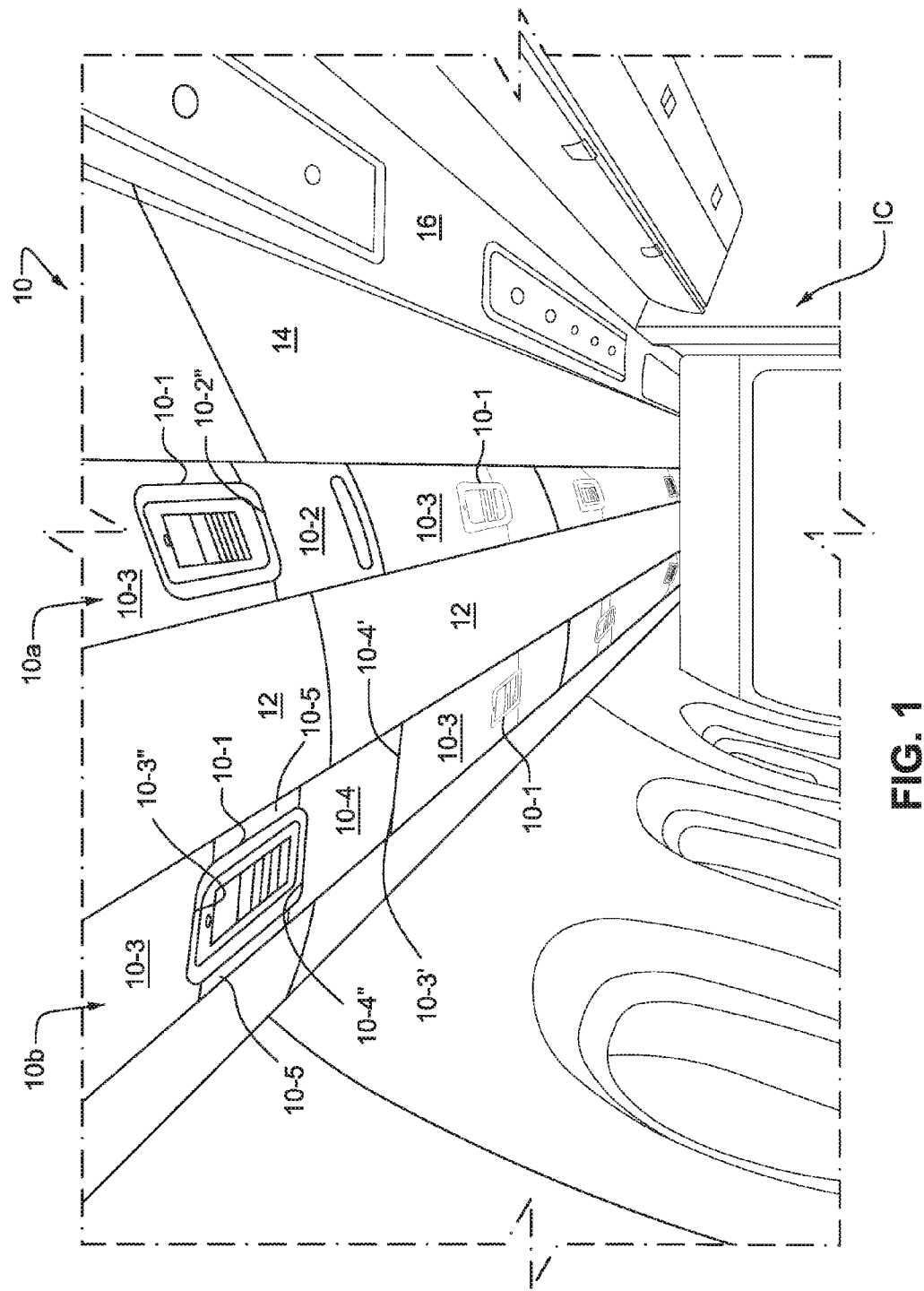
FIG. 1 is partial perspective view of an interior aircraft cabin showing an overhead PSU assembly of modular passenger service components according to one embodiment of the invention on a starboard side of the aircraft cabin (i.e., the starboard side of the aircraft's centerline)

Accompanying FIG. 1 depicts one embodiment of an overhead PSU system 10 installed on the starboard side of an aircraft interior cabin IC (i.e., the starboard side of the aircraft's longitudinal centerline) according to one embodiment of the invention. It will be understood that reference to an aircraft interior cabin IC is merely an exemplary embodiment of the invention since the PSU system 10 could equally be employed in other transport vehicles (e.g., trains, busses, boats and the like) It will also be appreciated that the discussion below is equally applicable to an overhead PSU system 10 installed on the port side of the aircraft interior cabin in the form of a mirror image of the starboard side installation.

As shown, the PSU system 10 will include inboard and outboard (i.e., relative to the aircraft's longitudinal centerline) PSU assemblies 10a, 10b that are oriented generally parallel to the aircraft's longitudinal axis and positioned generally overhead of each inboard and outboard passenger seat (not shown) in a seat row. The PSU assemblies 10a, 10b are latitudinally separated from one another (i.e., relative to a latitudinal axis of the aircraft) by an aligned series of spacer panels 12. The PSU system 10 may be provided in combination with an overhead bin assembly 14 for storage of a passenger's carry-on articles. Overhead aisle lighting units 16 may be provided in the aircraft interior cabin IC to illuminate the center passenger aisle between seat rows.

Figure 2:
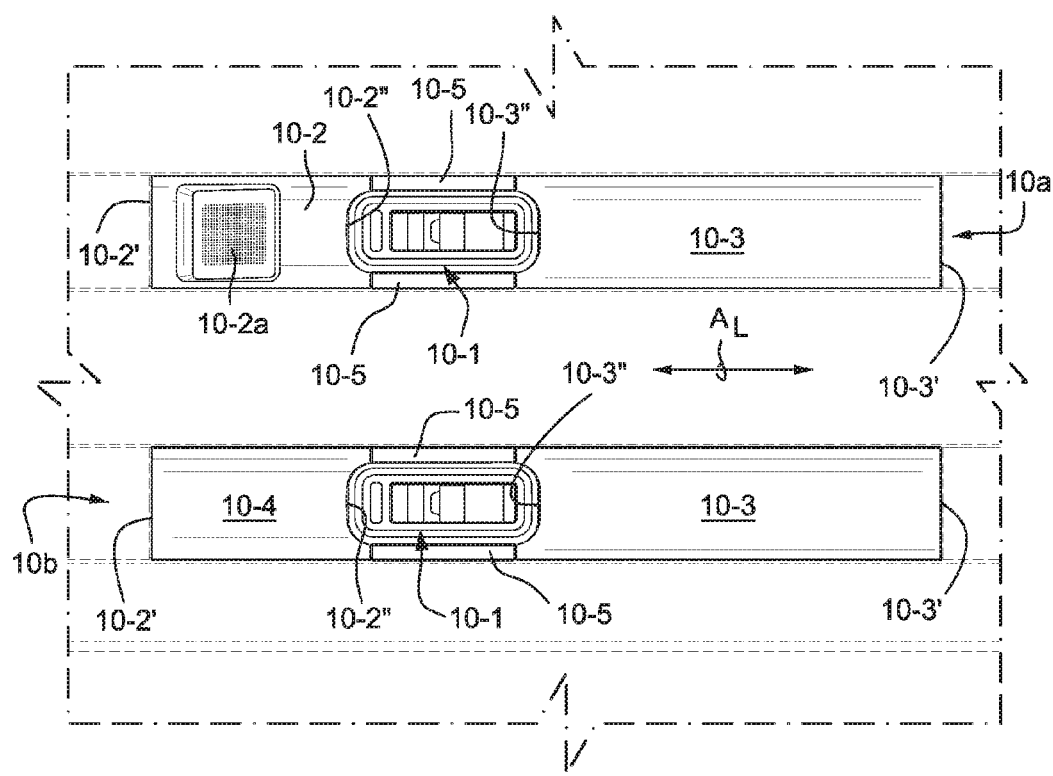
FIG. 2 is a plan view of the overhead PSU assembly depicted in FIG. 1 as seen from below.

Accompanying FIG. 2 depicts in greater detail the overhead PSU system 10 that is shown in FIG. 1. In this regard, it will be observed that the inboard PSU assembly 10a may be formed of a number of modular components assembled end-to-end in a series. By way of example, the inboard PSU assembly 10a may include a modular PSU component 10-1 which is positioned between a modular audio speaker component 10-2 having an audio speaker 10-2a which allows for audio output of, e.g., cabin crew announcements and the like, and a modular lengthwise spacer component 10-3. By way of further example, the outboard PSU assembly 10b may include a modular PSU component 10-1 positioned between a modular emergency oxygen component 10-4 and a modular lengthwise spacer component 10-3. The modular components 10-2, 10-3 and 10-4 will include at one end thereof a transverse edge 10-2', 10-3' and 10-4', and at an opposite end thereof a recessed edge 10-2", 10-3" and 10-4", respectively, so as to accommodate an edge region of the modular PSU component 10-1 when abutted thereagainst. A pair of lateral spacer strips 10-5 are provided adjacent to the modular PSU component so as to extend between the recessed ends 10-2" or 10-4" of modular components 10-2 or 10-4 and the recessed end 10-3" of an opposed modular spacer component 10-3 respectively.

Figure 3:
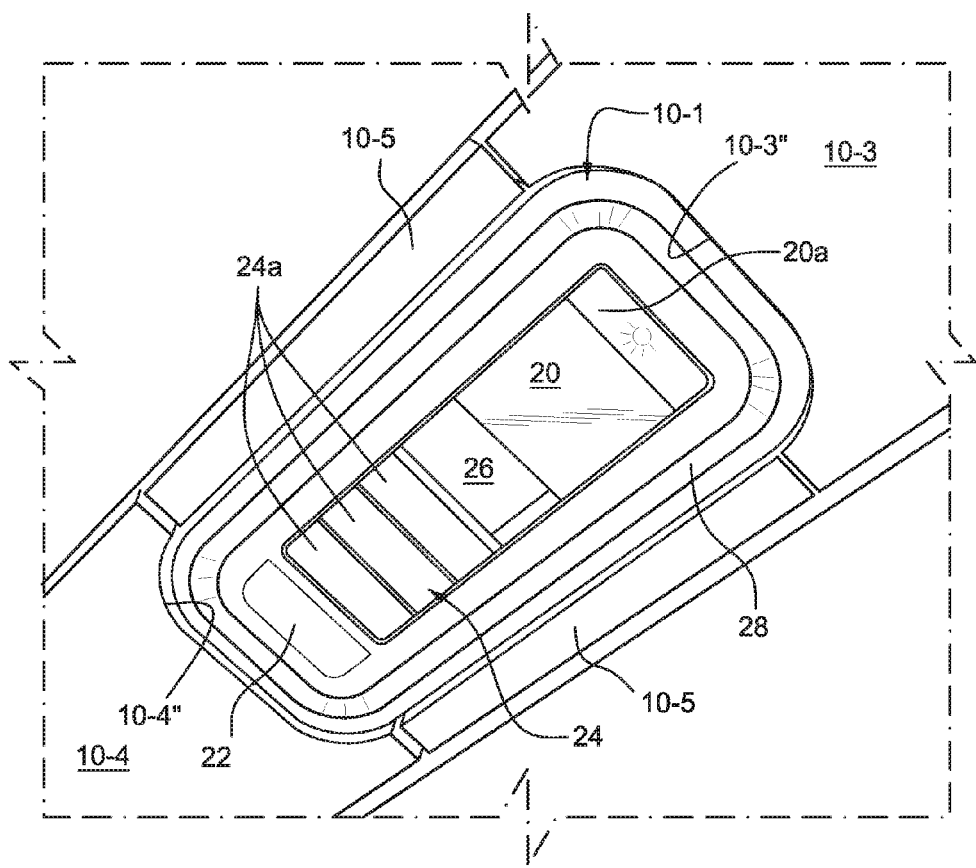
FIG. 3 is an enlarged view from a seated passenger's perspective of a modular PSU component employed in the overhead PSU assembly depicted in FIG. 1.

Accompanying FIG. 3 is an enlarged perspective view of the modular PSU component 10-1. As can be seen, the embodiment of the modular PSU component 10-1 includes several functions for passenger comfort and in-flight service. Specifically, the modular PSU component 10-1 will preferably include at one end a light unit 20 which may be activated/deactivated by pressing the light switch 20a to provide the illumination of the passenger's individual seated space. An attendant call button 22 may be provided at an opposite end of the switch 20a to provide an alert to flight attendants that a passenger may need some assistance.

The modular PSU component 10-1 is also provided with an air flow outlet diverter 24 in the form of pivotal vanes 24a that may be manually manipulated by a passenger's fingers inserted into a central recessed channel 26. A perimeter light band 28 can be provided with a light (e.g., a white light or a soothing colored light such as green or blue) which can be activated by flight attendants during aircraft boarding/unboarding.

It will be observed that the inboard and outboard PSU assemblies 10a, 10b as depicted in FIGS. 1 and 2 are substantially parallel to one another and to the aircraft's longitudinal axis (i.e., axis $A_L$ in FIG. 2). Moreover, modular PSU components 10-1 of the inboard and outboard assemblies 10a, 10b are aligned with one another along the aircrafts latitudinal axis (i.e., an axis perpendicular to axis $A_L$). Thus, the embodiment of the inboard and outboard assemblies 10a, 10b is especially adapted for use in combination with a side-by-side seating arrangement within the interior cabin IC whereby the seats are positioned in a row aligned with the aircraft's latitudinal axis. In such an arrangement, therefore, the individual seats in the row are aligned with a common coincident latitudinal axis. However, as will be discussed in greater detail below in relation to FIGS. 5 and 6, the modular components of the inboard and outboard assemblies 10a, 10b could be constructed so that the individual modular PSU components 10-1 thereof are staggered in the direction of the aircraft's longitudinal axis to thereby permit individual aircraft seats to likewise be staggered (i.e., such that each seat is arranged relative to a respective latitudinal axis that is longitudinally separated from a latitudinal axis of an adjacent seat).

Figure 4:
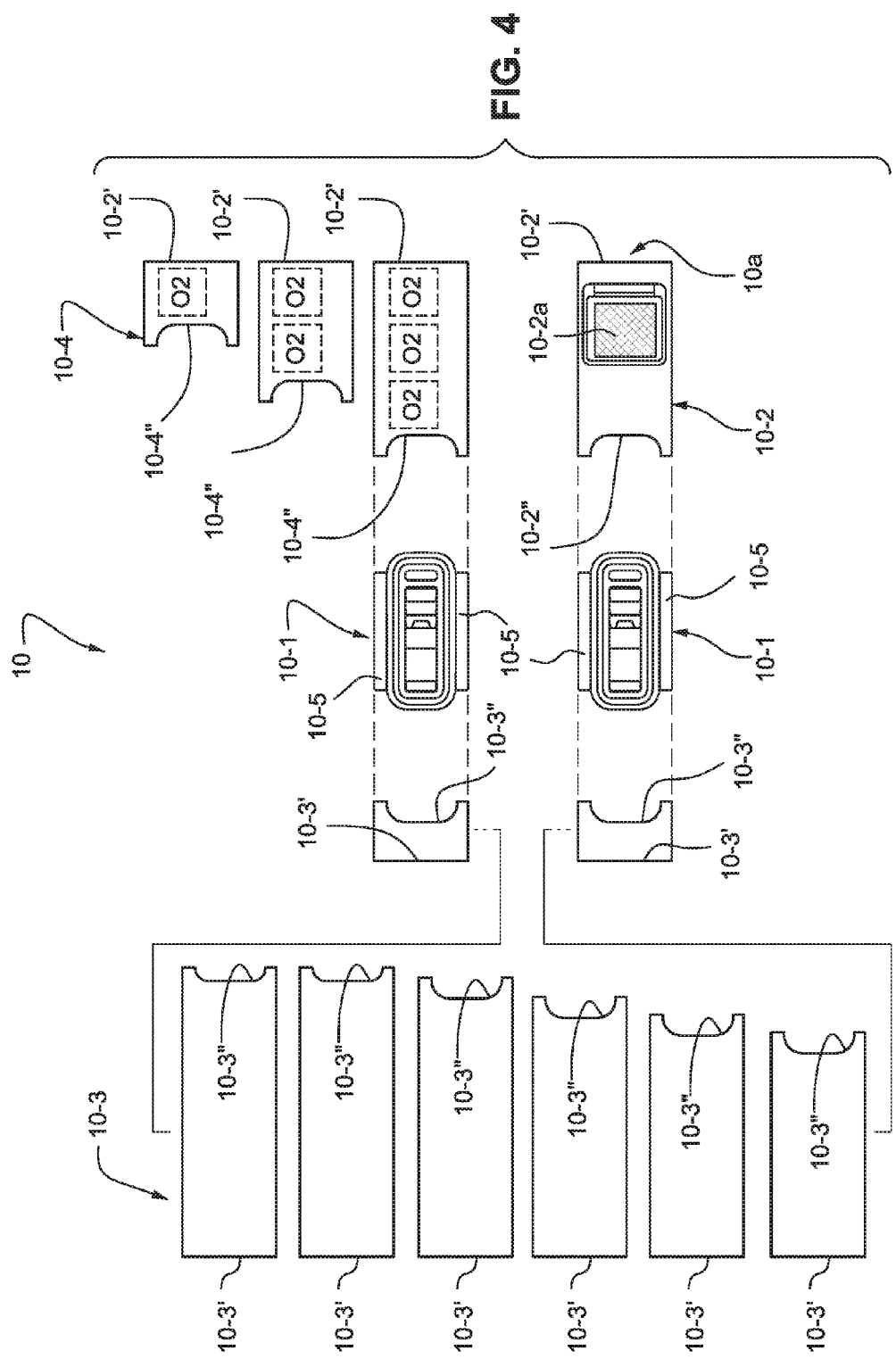
FIG. 4 is an exploded plan view showing various modular PSU components that may be grouped as needed according to aircraft interior design to form overhead PSU assemblies according to the invention.
Figure 5:
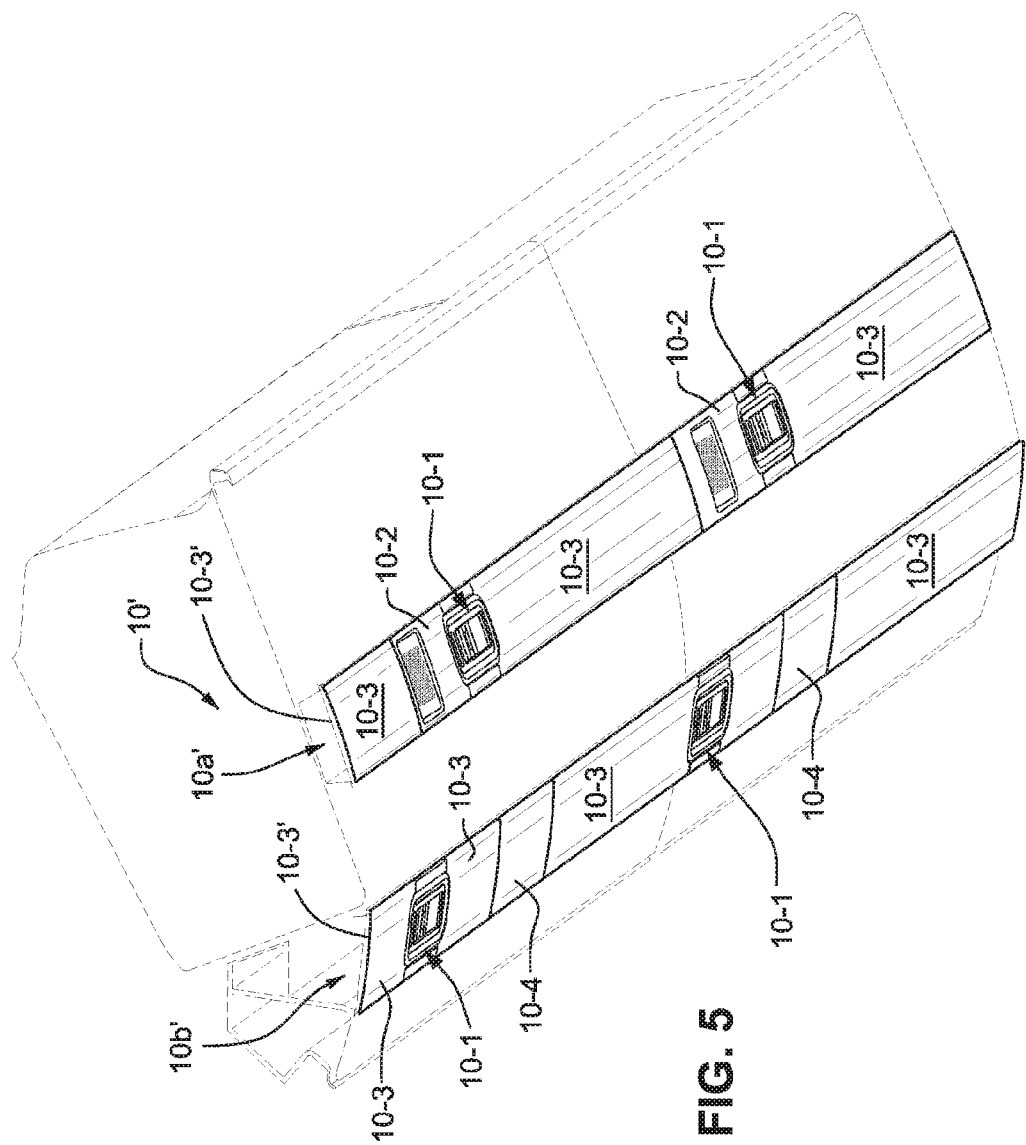
FIG. 5 is perspective as viewed from below showing an overhead PSU assembly of modular passenger service components according to another embodiment of the invention.
Figure 6:
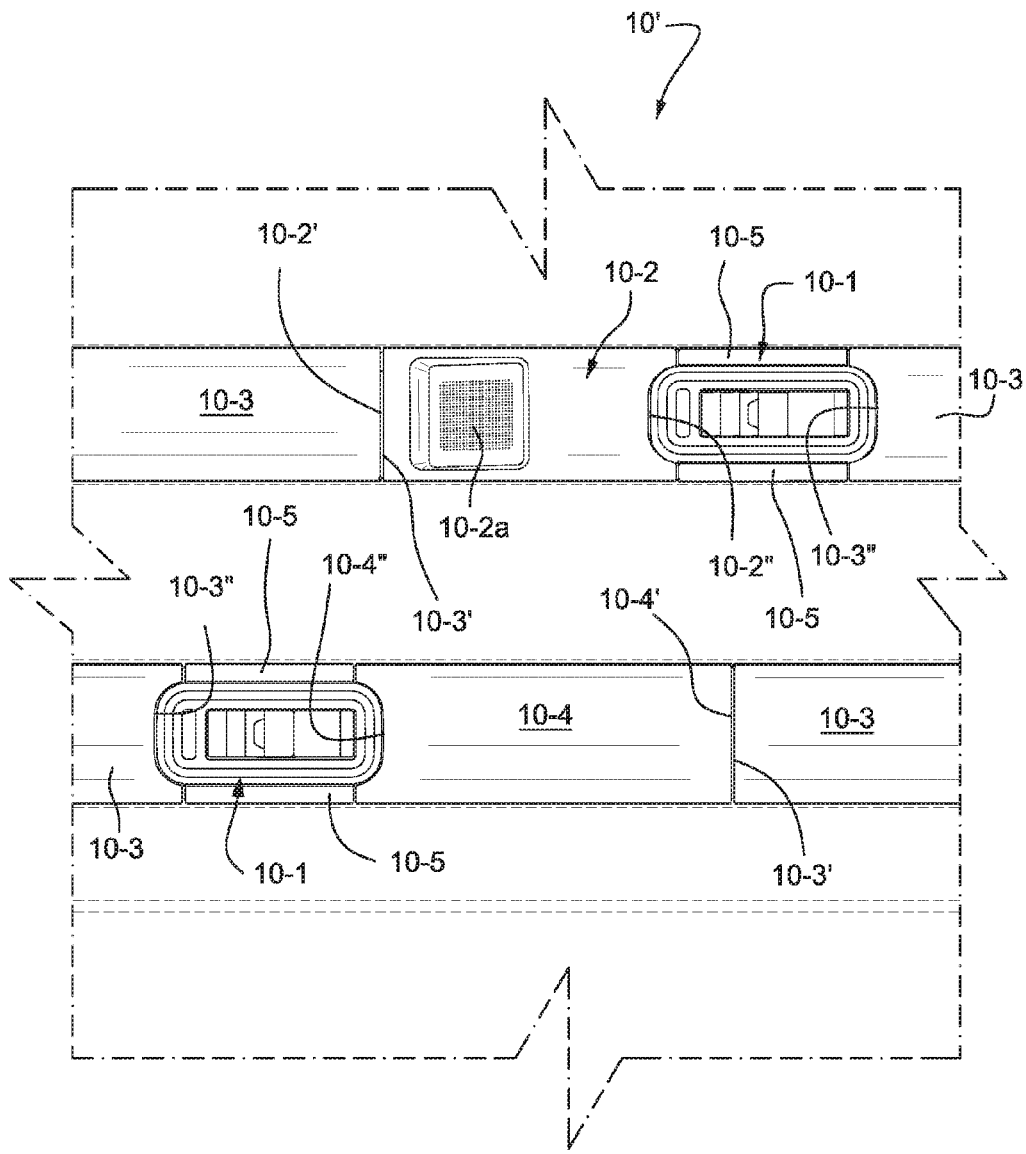
FIG. 6 is a plan view of the overhead PSU assembly depicted in FIG. 5 as seen from below.

An exemplary array of possible modular components that may be assembled in an end-to-end manner relative to one another so as to provide the inboard and outboard PSU assemblies 10a, 10b, respectively, is depicted in FIG. 4. As is shown, both the modular emergency oxygen components 10-4 and modular lengthwise spacer components 10-3 may be provided with varying lengthwise dimensions to allow the layout of the modular PSU components 10-1 in an aligned configuration (e.g., as shown in FIG. 2) or to allow the modular PSU components to be staggered relative to one another (e.g., as shown in FIGS. 5 and 6). The varying lengths of the modular emergency oxygen components 10-4 and modular lengthwise spacer components 10-3 additionally allow the PSU assemblies 10a, 10b to be accommodated within different sizes of aircraft interior cabins IC. In addition, the different lengthwise dimensions of the emergency oxygen components 10-4 will allow at least one emergency oxygen delivery system (e.g., oxygen masks and associated tubing that is operatively connected to the aircraft's onboard emergency oxygen system which deploy automatically in response to depressurization of the aircraft's interior cabin IC) to be installed in dependence upon the passenger seat layout. Due to the modular nature of the components, therefore, greater flexibility in layouts of the PSU component 10-1 can be achieved.

Accompanying FIGS. 5 and 6 depict a staggered arrangement of the modular PSU components 10-1 associated with the inboard and outboard PSU assemblies 10a', 10b', respectively, associated with the PSU system 10'. By way of example, the inboard PSU assembly 10a' may include adjacently positioned modular PSU and speaker components 10-1 and 10-2 in a manner similar to the embodiment described previously (see FIG. 2). However, unlike the previously described embodiment, modular longitudinal spacers 10-3 of greater length as compared to the modular longitudinal spacers 10-3 associated with the outboard PSU assembly 10b' thereby physically staggering the modular PSU components 10-1 relative to the aircraft's longitudinal axis $A_L$ (which in turn allows the individual passenger seats to be physically staggered for improved spatial passenger comfort). The modular emergency oxygen components 10-4 may be provided in the outboard PSU assembly 10b' and are of a sufficient lengthwise dimension so as to house multiple (at least two) emergency oxygen delivery systems (i.e., so as to provide emergency oxygen delivery to each occupant of the staggered seats below the modular PSU components 10-1).

Using various combinations of the modular components 10-1 through 10-4 as described above, the aircraft interior designer will have greater flexibility to design passenger seating layouts that is currently possible with conventional one-piece PSUs. Therefore, it will be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. An elongate passenger service unit (PSU) assembly comprised of:
   a plurality of modular passenger service units; and
   a plurality of variable-length modular spacer units;
     wherein
   the modular spacer units have a transverse edge and a recessed edge at respective opposite ends thereof, and wherein
   the modular spacer units are positioned between the modular passenger service units in an end-to-end manner in such a manner that the recessed edge receives therein a respective edge region of a modular passenger service unit so as to provide a desired lengthwise array of the passenger service units along the PSU assembly.

2. The PSU assembly as in claim 1, further comprising at least one modular audio speaker unit having a transverse edge and a recessed edge at respective opposite ends thereof, wherein the at least one modular audio speaker unit is connected in an end-to-end manner with at least one of the modular passenger service units such that the recessed edge of the modular audio speaker unit receives therein a respective edge region of a modular passenger service unit opposite to the recessed edge of the modular spacer unit.

3. The PSU assembly as in claim 1, further comprising at least one modular emergency oxygen component accommodating at least one emergency oxygen delivery system therewithin, the at least one modular emergency oxygen component having a transverse edge and a recessed edge at respective opposite ends thereof, wherein the at least one modular emergency oxygen delivery unit is connected in an end-to-end manner with at least one of the modular passenger service units such that the recessed edge of the emergency oxygen delivery unit receives therein a respective edge region of a modular passenger service unit opposite to the recessed edge of the modular spacer unit.

4. The PSU assembly as in claim 3, comprising a plurality of modular emergency oxygen components of varying length, each respectively accommodating at least one emergency oxygen delivery system therewithin.

5. The PSU assembly as in claim 1, wherein each modular passenger safety unit comprises:
   a light unit and a light switch to activate/deactivate the light unit;
   an attendant call button; and
   an air flow outlet diverter.

6. The PSU assembly as in claim 5, wherein the air flow outlet diverter comprises a plurality of pivotal vanes.

7. The PSU assembly as in claim 6, wherein each of the modular passenger service units comprises a recessed channel adjacent to the pivotal vanes to allow for manual manipulation thereof.

8. The PSU assembly as in claim 5, further comprising a perimeter light band which bounds the light unit, attendant call button and air flow diverter.

9. An aircraft comprising an interior cabin, passenger seats arranged side-by-side within the interior cabin, and parallel inboard and outboard PSU assemblies positioned overhead each of the passenger seats in a lengthwise direction of the interior cabin, wherein each of the PSU assemblies comprises:
   a plurality of modular passenger service units; and
   a plurality of variable-length modular spacer units; wherein
   the modular spacer units have a transverse edge and a recessed edge at respective opposite ends thereof, and wherein
   the modular spacer units are positioned between the modular passenger service units in an end-to-end manner in such a manner that the recessed edge receives therein a respective edge region of a modular passenger service unit so as to provide a desired lengthwise array of the passenger service units along the PSU assembly, and wherein
   the passenger seats are latitudinally aligned with one another, and wherein the modular spacer units are positioned between the passenger service units so that adjacent ones of the passenger service units in the inboard and outboard PSU assemblies are latitudinally aligned with one another.

10. The aircraft as in claim 9, further comprising spacer panels positioned between the inboard and outboard PSU assemblies.

11. The aircraft as in claim 10, wherein the interior cabin further comprises overhead storage bins, wherein the inboard and outboard PSU assemblies are provided at a lower extent of the overhead storage bins.

12. The aircraft as in claim 11, wherein the interior cabin further comprises an overhead aisle lighting unit, wherein the overhead storage bins and the inboard and outboard PSU assemblies are positioned laterally of the overhead aisle lighting unit.

13. The aircraft in claim 9, wherein at least one of the inboard and outboard PSU assemblies further comprise at least one modular audio speaker unit having a transverse edge and a recessed edge at respective opposite ends thereof, wherein the at least one modular audio speaker unit is connected in an end-to-end manner with at least one of the modular passenger service units such that the recessed edge of the modular audio speaker unit receives therein a respective edge region of a modular passenger service unit opposite to the recessed edge of the modular spacer unit.

14. The aircraft in claim 9, wherein at least one of the inboard and outboard PSU assemblies further comprise at least one modular emergency oxygen component accommodating at least one emergency oxygen delivery system therewithin, the at least one modular emergency oxygen component having a transverse edge and a recessed edge at respective opposite ends thereof, wherein the at least one modular emergency oxygen delivery unit is connected in an end-to-end manner with at least one of the modular passenger service units such that the recessed edge of the emergency oxygen delivery unit receives therein a respective edge region of a modular passenger service unit opposite to the recessed edge of the modular spacer unit.

15. The aircraft as in claim 14, comprising a plurality of modular emergency oxygen components of varying length, each respectively accommodating at least one emergency oxygen delivery system therewithin.

16. The aircraft as in claim 9, wherein each modular passenger safety unit comprises:
a light unit and a light switch to activate/deactivate the light unit;
an attendant call button; and
an air flow outlet diverter.

17. The aircraft as in claim 16, wherein the air flow outlet diverter comprises a plurality of pivotal vanes.

18. The aircraft as in claim 17, wherein each of the modular passenger service units comprises a recessed channel adjacent to the pivotal vanes to allow for manual manipulation thereof.

19. The aircraft as in claim 16, further comprising a perimeter light band which bounds the light unit, attendant call button and air flow diverter.

20. An aircraft comprising an interior cabin, passenger seats arranged side-by-side within the interior cabin, and parallel inboard and outboard PSU assemblies positioned overhead each of the passenger seats in a lengthwise direction of the interior cabin, wherein each of the PSU assemblies comprises:
a plurality of modular passenger service units; and
a plurality of variable-length modular spacer units; wherein
the modular spacer units have a transverse edge and a recessed edge at respective opposite ends thereof, and wherein
the modular spacer units are positioned between the modular passenger service units in an end-to-end manner in such a manner that the recessed edge receives therein a respective edge region of a modular passenger service unit so as to provide a desired lengthwise array of the passenger service units along the PSU assembly, and wherein
the passenger seats are longitudinally staggered relative to one another, and wherein the modular spacer units are positioned between the passenger service units so that adjacent ones of the passenger service units in the inboard and outboard PSU assemblies longitudinally staggered with one another.

21. The aircraft as in claim 20, further comprising spacer panels positioned between the inboard and outboard PSU assemblies.

22. The aircraft as in claim 21, wherein the interior cabin further comprises overhead storage bins, wherein the inboard and outboard PSU assemblies are provided at a lower extent of the overhead storage bins.

23. The aircraft as in claim 22, wherein the interior cabin further comprises an overhead aisle lighting unit, wherein the overhead storage bins and the inboard and outboard PSU assemblies are positioned laterally of the overhead aisle lighting unit.

24. The aircraft in claim 20, wherein at least one of the inboard and outboard PSU assemblies further comprise at least one modular audio speaker unit having a transverse edge and a recessed edge at respective opposite ends thereof, wherein the at least one modular audio speaker unit is connected in an end-to-end manner with at least one of the modular passenger service units such that the recessed edge of the modular audio speaker unit receives therein a respective edge region of a modular passenger service unit opposite to the recessed edge of the modular spacer unit.

25. The aircraft in claim 20, wherein at least one of the inboard and outboard PSU assemblies further comprise at least one modular emergency oxygen component accommodating at least one emergency oxygen delivery system therewithin, the at least one modular emergency oxygen component having a transverse edge and a recessed edge at respective opposite ends thereof, wherein the at least one modular emergency oxygen delivery unit is connected in an end-to-end manner with at least one of the modular passenger service units such that the recessed edge of the emergency oxygen delivery unit receives therein a respective edge region of a modular passenger service unit opposite to the recessed edge of the modular spacer unit.

26. The aircraft as in claim 25, comprising a plurality of modular emergency oxygen components of varying length, each respectively accommodating at least one emergency oxygen delivery system therewithin.

27. The aircraft as in claim 20, wherein each modular passenger safety unit comprises:
a light unit and a light switch to activate/deactivate the light unit;
an attendant call button; and
an air flow outlet diverter.

28. The aircraft as in claim 27, wherein the air flow outlet diverter comprises a plurality of pivotal vanes.

29. The aircraft as in claim 28, wherein each of the modular passenger service units comprises a recessed channel adjacent to the pivotal vanes to allow for manual manipulation thereof.

30. The aircraft as in claim 27, further comprising a perimeter light band which bounds the light unit, attendant call button and air flow diverter.

* * * * *